United States Patent
Shackleton et al.

(10) Patent No.: US 7,263,116 B2
(45) Date of Patent: Aug. 28, 2007

(54) DIELECTRIC COUPLED $CO_2$ SLAB LASER

(75) Inventors: Christian J. Shackleton, Los Gatos, CA (US); Phillip J. Gardner, West Hartford, CT (US); Anthony J. DeMaria, West Hartford, CT (US); Vernon Seguin, Windsor, CT (US); John T. Kennedy, Granby, CT (US)

(73) Assignee: Coherent, Inc., Santa Clara, CA (US)

( * ) Notice: Subject to any disclaimer, the term of this patent is extended or adjusted under 35 U.S.C. 154(b) by 282 days.

(21) Appl. No.: 10/912,507

(22) Filed: Aug. 5, 2004

(65) Prior Publication Data

US 2006/0029116 A1 Feb. 9, 2006

(51) Int. Cl.
*H01S 3/03* (2006.01)
*H01S 3/223* (2006.01)
*H01S 3/097* (2006.01)

(52) U.S. Cl. ............... 372/64; 372/55; 372/61; 372/87

(58) Field of Classification Search ........... 372/55, 372/95, 64, 87, 92, 99, 57, 61
See application file for complete search history.

(56) References Cited

U.S. PATENT DOCUMENTS

| | | | | |
|---|---|---|---|---|
| 3,745,481 A | | 7/1973 | Erickson et al. | 331/94.5 |
| 3,748,594 A | * | 7/1973 | Pugh | 372/58 |
| 3,828,277 A | | 8/1974 | Otto et al. | 331/94.5 |
| 4,493,087 A | * | 1/1985 | Laakman et al. | 372/64 |
| 4,686,682 A | * | 8/1987 | Haruta et al. | 372/87 |
| 4,719,639 A | * | 1/1988 | Tulip | 372/66 |
| 4,756,000 A | * | 7/1988 | Macken | 372/59 |
| 4,885,754 A | * | 12/1989 | Egawa | 372/86 |
| 4,939,738 A | * | 7/1990 | Opower | 372/95 |
| 5,088,102 A | | 2/1992 | Krueger et al. | 372/64 |
| 5,091,914 A | * | 2/1992 | Maeda et al. | 372/61 |

(Continued)

OTHER PUBLICATIONS

A.D. Colley et al., "High brightness slab waveguide carbon monoxide laser," *Appl. Phys. Lett.*, vol. 64, No. 22, May 30, 1994, pp. 2916-2918.

(Continued)

*Primary Examiner*—Minsun Oh Harvey
*Assistant Examiner*—Phillip Nguyen
(74) *Attorney, Agent, or Firm*—Stallman & Pollock LLP (57) ABSTRACT

A slab laser includes two elongated electrodes arranged spaced apart and face-to-face. Either one or two slabs of a solid dielectric material extend along the length of the electrodes between the electrodes. A discharge gap is formed either between one of the electrodes and one dielectric slab, or between two dielectric slabs. The discharge gap is filled with lasing gas. A pair of mirrors is configured and arranged to define a laser resonator extending through the gap. An RF potential is applied across the electrodes creating a gas discharge in the gap, and causing laser radiation to circulate in the resonator. Inserting dielectric material between the electrodes increases the resistance-capacitance (RC) time constant of the discharge structure compared with the RC time constant in the absence of dielectric material. This hinders the formation of arcs in the discharge, which enables the laser to operate with higher excitation power, higher lasing gas pressure, and higher output power than would be possible without the dielectric inserts.

26 Claims, 10 Drawing Sheets

U.S. PATENT DOCUMENTS

| | | | |
|---|---|---|---|
| 5,123,028 A | 6/1992 | Hobart et al. | 372/95 |
| 5,283,797 A * | 2/1994 | Mefferd | 372/34 |
| 5,353,297 A | 10/1994 | Koop et al. | 372/64 |
| 5,748,663 A * | 5/1998 | Chenausky | 372/64 |
| 5,771,259 A | 6/1998 | Dvorkin | 372/87 |
| 5,982,803 A | 11/1999 | Sukhman et al. | 372/87 |
| 6,134,256 A * | 10/2000 | Chenausky | 372/61 |
| 6,192,061 B1 | 2/2001 | Hart et al. | 372/87 |
| 6,697,408 B2 | 2/2004 | Kennedy et al. | 372/55 |
| 6,999,490 B2 * | 2/2006 | Kennedy et al. | 372/55 |
| 2002/0097767 A1 * | 7/2002 | Krasnov | 372/55 |
| 2003/0058913 A1 | 3/2003 | Shackleton et al. | 372/55 |
| 2005/0175054 A1 * | 8/2005 | Shackleton et al. | 372/55 |

OTHER PUBLICATIONS

J. Xin et al., "Radio frequency discharge excited diffusively cooled kilowatt carbon monoxide slab waveguide laser with a three mirror resonator," *Applied Physics Letters*, vol. 75, No. 10, Sep. 6, 1999, pp. 1369-1370.

* cited by examiner

DIELECTRIC COUPLED $CO_2$ SLAB LASER

TECHNICAL FIELD OF THE INVENTION

The present invention relates generally to carbon dioxide ($CO_2$) slab lasers. The invention relates in particular to a slab laser having a dielectric coupling-element between metal slab electrodes.

DISCUSSION OF BACKGROUND ART $CO_2$ lasers are commonly used in commercial manufacturing for operations such as cutting or drilling, in particular, in nonmetallic materials. One form of $CO_2$ laser suited for such operations is known to practitioners of the art as a "slab" laser. Such a laser has an assembly including a pair of elongated, slab-like planar electrodes arranged face-to-face and spaced apart to define a gap between the electrodes. The electrodes are usually contained in a gas tight enclosure. The enclosure and the gap between the electrodes are filled with a lasing gas mixture including $CO_2$. A radio frequency (RF) potential is applied across the electrodes to cause an electrical discharge in the $CO_2$ laser gas mixture. The discharge energizes the $CO_2$ lasing gas. A pair of mirrors is arranged, with one thereof at each end of the pair of electrodes, to form a laser resonator. A preferred type of resonator is a hybrid waveguide-unstable resonator. The energized $CO_2$ lasing gas provides optical gain allowing laser radiation to be generated in the resonator. The electrodes form a waveguide or light guide for the laser radiation in an axis of the resonator perpendicular to the plane of the electrodes. This confines the lasing mode of the resonator in that axis. The mirrors define the lasing mode in an axis parallel to the plane of the electrodes. In an unstable resonator arrangement, laser radiation is delivered from (in effect, spilled out of) the resonator by bypassing one of the resonator mirrors.

In a slab laser used for drilling, cutting, and other machining operations a high output power, for example, greater than about 100 Watts (W), and maximum possible efficiency are important. In any given slab laser configuration, available average output power generally increases with increasing gas pressure and RF input power, provided that the average RF input power does not heat the gas discharge beyond 600° K. Further, when operating in a pulsed-mode, significant increases in peak RF input power are possible with increasing gas pressure provided that a corresponding increase in peak optical output power is available. This peak power increase is available only provided that the pulse delivery duty cycle is delivered to limit the RF input power as previously discussed. With the increase in gas pressure, faster optical rise and fall times (of pulses) occur due to corresponding increases in molecular collision rates of excited species in the discharge and consequential increases in the decay rate of the upper excited laser level.

Generally, an upper limit in peak optical output power available for a specific slab laser configuration, operating in a pulsed mode, at a specific duty cycle and pulse repetition frequency is defined by stability of the RF discharge itself as peak RF input power is increased. As peak RF power is increased, a critical point is reached at which the RF discharge can collapse from a low current form to a power limiting form and can collapse further into damaging arcs. This adversely affects the mode quality and efficiency of the laser. There is a need for an improvement of discharge stability in slab lasers operating in a pulsed mode with very high peak input powers to achieve high peak optical powers from compact slab laser sources.

SUMMARY OF THE INVENTION

In one aspect a laser in accordance with the present invention comprises an enclosure containing a lasing gas. Two elongated electrodes are located in the enclosure, the electrodes being arranged spaced apart and face-to-face. A solid dielectric material is located between the electrodes in the form of one or more slabs extending along the length of the electrodes. The solid dielectric material has a total thickness less than the spacing between the electrodes, thereby forming an elongated gap, the gap being either between one of the electrodes and a dielectric slab, or between two dielectric slabs. The gap is filled with the lasing gas of the enclosure. A pair of mirrors is configured and arranged to define a laser resonant cavity extending through the gap. Means are provided for exciting the laser gas, to cause laser radiation to circulate in the resonant cavity. The height of the gap is selected such that the gap forms a waveguide for the laser radiation in a height direction of the gap. The width of the gap is selected such that the laser radiation is allowed to propagate in free space in the width direction of the gap, the mode of propagation being determined by the configuration and arrangement of the mirrors.

The dielectric insert between the RF electrodes is believed to add capacitive impedance in series with the structure of the RF discharge. This series capacitance addition acts to stabilize the discharge thereby allowing the desired increase in peak RF input power to the laser without the onset of discharge instabilities.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figures 1, 1A:
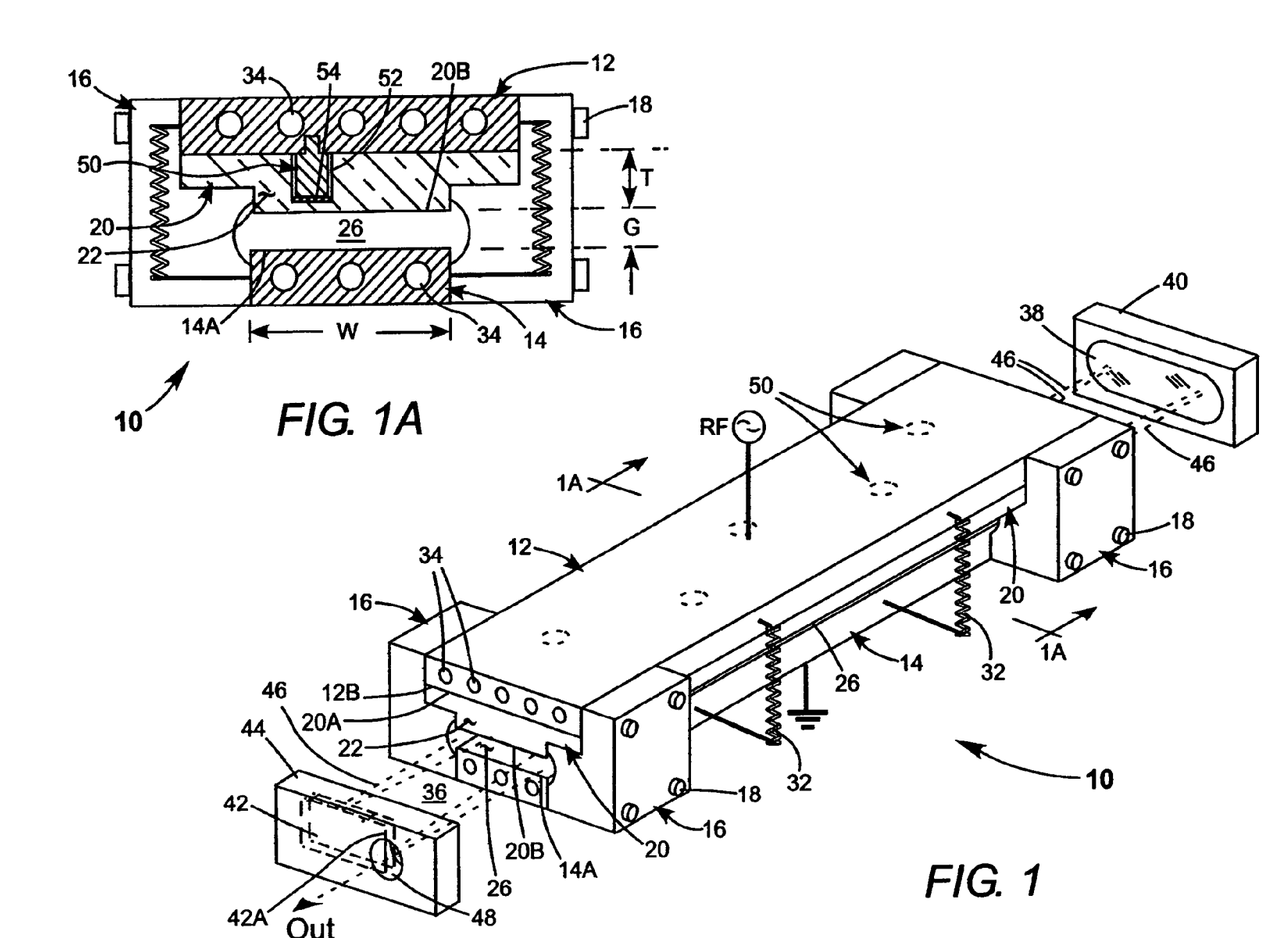
FIG. 1 schematically illustrates one preferred embodiment of a $CO_2$ slab laser in accordance with the present invention including first and second metal slab electrodes arranged face-to-face and spaced apart, and a dielectric slab located in contact with the first electrode and partially filling the space between the electrodes and also including two mirrors forming an off axis negative branch hybrid waveguide-unstable resonator extending between the electrodes.
FIG. 1A is a cross-section view seen generally in the direction 1A-1A of FIG. 1 schematically illustrating details of the electrodes and dielectric slab of the laser of FIG. 1, including details of a discharge igniter arrangement for facilitating igniting a gas discharge in lasing gas in a gap between the dielectric slab and the second electrode.

Turning now to the drawings, wherein like components are designated by like reference numerals, FIG. 1 and FIG. 1A schematically illustrate one preferred embodiment 10 of a $CO_2$ slab laser in accordance with the present invention. Laser 10 includes upper and lower slab electrodes 12 and 14, respectively, arranged spaced apart and face-to-face. Spacing of the electrodes is maintained by ceramic spacers 16 attached to the electrodes by screws 18. A ceramic slab (insert) 20 is positioned between the electrodes and held by the ceramic spacers with surface 20A of the slab in contact with surface 12B of electrode 12. Preferably, the ceramic slab extends the entire length of the electrodes. Preferred ceramic materials for slab 20 include alumina (aluminum oxide—$Al_2O_3$), beryllia (beryllium oxide—BeO), zirconia (zirconium dioxide ZrO2), and alumina and zirconia mixtures.

The spacing of the electrodes and the thickness (T) of a central portion 22 of the ceramic slab is selected such that there is a gap 26 of height G between planar surface 20B of central portion 22 of ceramic slab 20 and planar surface 14A of electrode 14. The planar surfaces bounding the gap are parallel to each other. Gap 26 has a width W, here, determined by the width of electrode 14. The assembly of electrodes 12 and 14 and ceramic slab 20 is contained in an enclosure (not shown) filled with a lasing gas mixture including $CO_2$. The lasing gas mixture fills gap 26. An RF potential is applied across electrodes 12 and 14. Here, the RF potential (supplied by an RF generator designated symbolically in FIG. 1) is applied to electrode 12 (the "hot" electrode), and electrode 14 (the ground electrode) is connected to ground potential. Electrodes 12 and 14 are inductively coupled by inductors 32. Applying the RF potential across the electrodes sustains an electrical discharge in the lasing gas in gap 26, thereby exciting (energizing) the laser gas. Electrodes 12 and 14 include channels 34 that allow the passage of a cooling fluid through the electrodes to remove heat generated by the discharge.

Energized $CO_2$ molecules in the discharge in gap 26 provide a gain medium for laser 10. Laser 10 includes a hybrid resonator formed including a waveguide resonator and an unstable resonator 36. Unstable resonator 36 is formed by a concave mirror 38 held in a mirror holder 40, and a concave mirror 42 (indicated in phantom in FIG. 1) held in a mirror holder 44. Both mirror 38 and mirror 42 preferably have a reflectivity of about 99.5% or greater at the laser wavelength. The width W of gap 26 is selected such that laser radiation propagates in free space in a direction parallel to the electrodes, i.e., in the width direction of the gap. The mode propagation is determined, inter alia, by the spacing and curvature of the mirrors.

In this example, the mirrors of unstable resonator 36 are arranged and configured such that laser radiation circulates through gap 26 between ceramic slab 20 and electrode 14 in a zigzag fashion, as indicated by dashed lines 46. The laser radiation exits the resonator around edge 42A of mirror 42 and then through an aperture 48 in mirror holder 44. The waveguide portion of laser resonator is defined by electrodes 12 and 14 and mirrors 38 and 42 and is perpendicular to the above described unstable resonator portion. Height G of gap 26 is selected such that surface 14A of electrode 14 and surface 20B of ceramic slab 20 effectively form a waveguide for laser radiation in a direction perpendicular to the plane of electrodes 12 and 14, i.e., in the height direction of the gap. The waveguide portion of the resonator is completed by mirrors 38 and 42. Laser radiation propagation modes are restricted, in that direction only, by the waveguide effect.

Figure 1B:
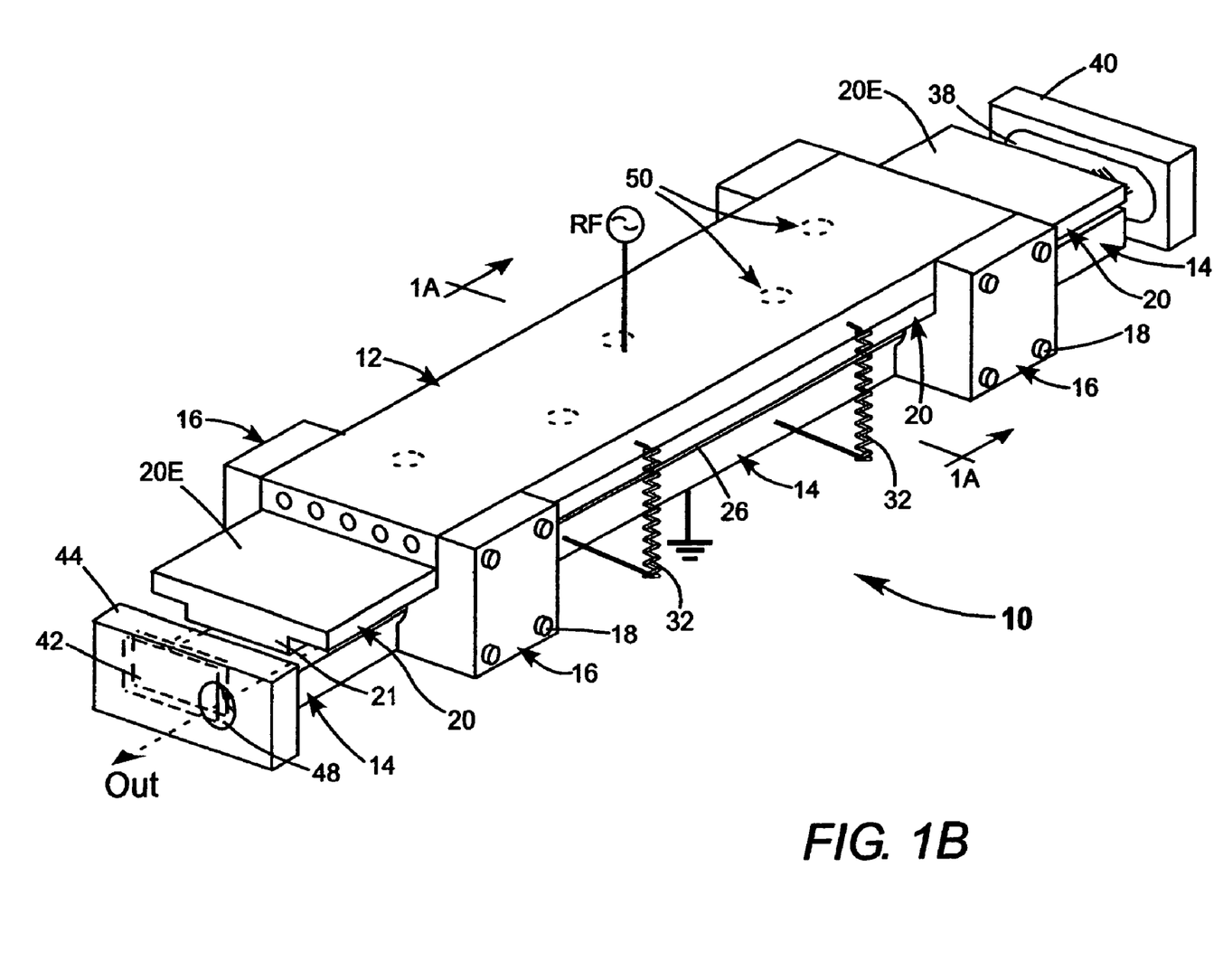
FIG. 1B schematically illustrates the laser of FIG. 1 further including ceramic mirror-shields located between the ends of the electrodes and the mirrors.

It is preferable to space mirrors 38 and 42 at a distance from the ends of electrodes 12 and 14 sufficient that the mirrors are not degraded by the discharge in gap 26. Preferably the spacing is about 20.0 mm or greater. Such a spacing, however, can lead to optical losses of laser radiation being redirected into gap 26 by the mirrors. One means of minimizing such optical losses is depicted in FIG. 1B. Here, in a laser 10, ceramic insert 20 has a portion 20E thereof extending longitudinally past the ends of hot electrode 12 each end thereof. Ground electrode 14, at each end thereof, is extended under ceramic extensions 20E. The extensions of electrode 14 are spaced apart from portion 21 of ceramic insert 20E by the gap height G. Extensions 20E and underlying electrode 14 provide a (one axis) waveguiding effect similar to that provided by the electrodes 12 and 14. The extensions may extend to within about 5.0 mm of the mirrors.

Preferred values for G, W, and T depend, inter alia, on lasing gas pressure, desired laser output power, and RF frequency. By way of example, for a gas pressure between about 80.0 and 200.0 Torr, an RF frequency of about 100.0 megahertz (MHz) and for an average output power between about 100.0 Watts (W) and 500.0 W, G is preferably between about 1.0 and 2.0 mm, and W is between about 20.0 millimeters (mm) and 80.0 mm for electrode lengths between about 40.0 centimeters (cm) and 85.0 cm. Ceramic slab thickness T is preferably as thin as is practical in order to maximize the capacitive impedance component for discharge stability. The thickness however should be at least sufficient to impart mechanical rigidity to the slab. Preferably the thickness is at least about 0.5 mm.

Because of the inventive inclusion of ceramic slab 26 between electrodes 12 and 14 it has been found advantageous to provide means for facilitating ignition of the gas discharge in gap 26. Referring in particular to FIG. 1A, one preferred means is to provide one or more igniter electrodes 50 that extend into ceramic slab 20 via apertures 52 therein. The positions of igniter electrodes 50 along electrode 12 are indicated in phantom in FIG. 1. The igniter electrodes are metal and preferably a close fit in apertures 52 and are in electrical contact with the base of the apertures via a contact 54, for example, a spring or a malleable metal disc. The igniter electrodes locally increase the electric field in gap 26, thereby facilitating the ignition of the discharge. (See U.S. patent application Ser. No. 10/624,411, filed Jul. 21, 2003 and incorporated herein by reference.)

It should be noted here that only details of laser 10 sufficient for understanding principles of the present invention are described above. General aspects of $CO_2$ slab laser construction, such as lasing-gas enclosure, and RF power supplies and connection thereof, are well known in the art to which the present invention pertains and, accordingly, are not described in detail herein. A detailed description of examples of slab lasers is provided in U.S. Pat. No. 5,123,028 the complete disclosure of which is hereby incorporated by reference. (See also, U.S. Pat. Nos. 6,192,061 and 6,697,408 also incorporated herein by reference.)

An object of locating ceramic slab 20 between electrodes 12 and 14 is to increase the capacitive component of the impedance experienced by the applied RF potential in general, and to limit, in particular, the difference of this impedance in the lit and unlit conditions of the discharge in gap 26. In prior-art slab $CO_2$ lasers there is only lasing gas between the slab electrodes. In an unlit condition, this gas is effectively a dielectric and the electrodes and the gas-filled gap behave as a capacitor. In the lit condition, the gas is electrically conductive, and the capacitive effect of the electrodes and the gap therebetween is minimized. Including slab 20 in the gap between the electrodes according to principles of the present invention provides a strong capacitive component of the electrode impedance even when the discharge in gap 26 is lit, and also minimizes the resonant frequency difference between the lit and unlit conditions. The increased capacitance provided by ceramic slab increases the RC time constant of the electrode-slab structure. This hinders formation of arcs in the discharge and enables an increased RF loading and a higher lasing gas pressure both provide for increasing laser output power without increasing the size of the laser.

Figures 2, 2A:
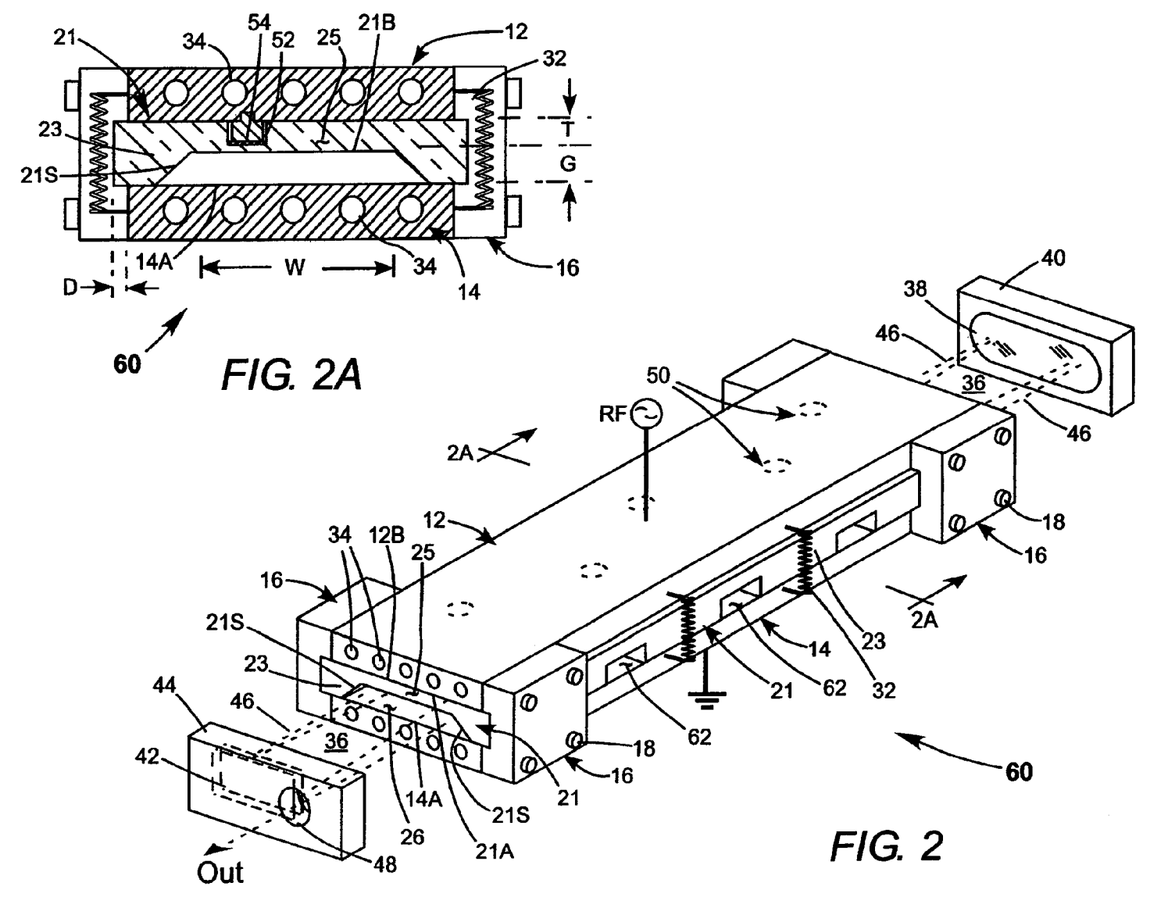
FIG. 2 schematically illustrates another preferred embodiment of a $CO_2$ slab laser in accordance with the present invention, similar to the laser of FIG. 1, but wherein the ceramic slab is supported by raised edges thereof in contact with the second electrode.
FIG. 2A is a cross-section view seen generally in the direction 2A-2A of FIG. 1 schematically illustrating details of the electrodes and dielectric slab of the laser of FIG. 2, including a discharge igniter arrangement.

FIG. 2 and FIG. 2A schematically illustrate another embodiment 60 of a slab $CO_2$ laser in accordance with the present invention. Laser 60 includes first and second elongated slab electrodes 12 and 14, held spaced apart by ceramic spacers 16 as in laser 10. Electrodes 12 and 14 in laser 60 have the same width. As the electrodes and spacers have the same function in both lasers, the electrodes and spacers are designated by the same numerals even though electrode 14 is wider in laser 60 than in laser 10, and the spacers differ in shape in laser 10. Located between electrodes 12 and 14 is a ceramic slab 21. Surface 21A of ceramic slab 21 is in contact with surface 12B of electrode 12. Slab 21 has raised edge portions 23 that are supported on surface 14A of electrode 14, leaving a thinner central portion 25 therebetween. This maintains surface 21B of slab 21 spaced apart from surface 14A of electrode 14 thereby providing a discharge gap 26. Central portion 25 preferably has a thickness of at least 0.5 mm. An RF discharge is created in gap 26 as described above with reference to laser 10 of FIG. 1. Gap 26 has a width W, here, less than the width of the electrodes and determined by the width of central portion 25 of ceramic slab 21. An unstable resonator 36 is formed by a concave mirror 38 a concave mirror 42 as described above with reference to laser 10 of FIG. 1.

Slab 21 and raised edges 23 thereof preferably extend the entire length of the slab electrodes. Slab 21 extends laterally by a distance D beyond the longitudinal edges of electrodes 12 and 14. Preferably D is about 2.0 mm or greater, and more preferably about 6.0 mm or greater. This lateral extension of the slab increases the surface resistance of ceramic between the electrodes over that which would exist without such an extension. This increased surface resistance minimizes the possibility of a surface discharge occurring between the electrode edges instead of a discharge in gap 26.

Apertures 62 are provided at intervals along ceramic slab 21 extending laterally through raised edges 23 thereof. This facilitates flow of lasing gas into gap 26 and minimizes acoustic resonance in the gap under RF pulsed excitation conditions. Surfaces 21S of slab 21, in effect, form sidewalls extending alongside the discharge gap. These surfaces are preferably roughened to minimize any possible guiding action that might compromise the function of resonator mirrors 38 and 42 in determining laser mode behavior in the plane parallel to the plane of the electrodes. Surfaces 21S are preferably sloped or beveled as depicted in FIG. 2 but this should not be considered as limiting the present invention.

The function of ceramic slab 21 is similar to that of ceramic slab 20 of laser 10. However, the raised edges of ceramic slab 21, combined with additional electrode width provide for increasing the capacitive component of the electrode impedance, thereby reducing the impedance difference between lit and unlit conditions. This, however, is achieved with a requirement to provide apertures in the ceramic slab to facilitate gas flow into discharge gap 26.

Figure 3:
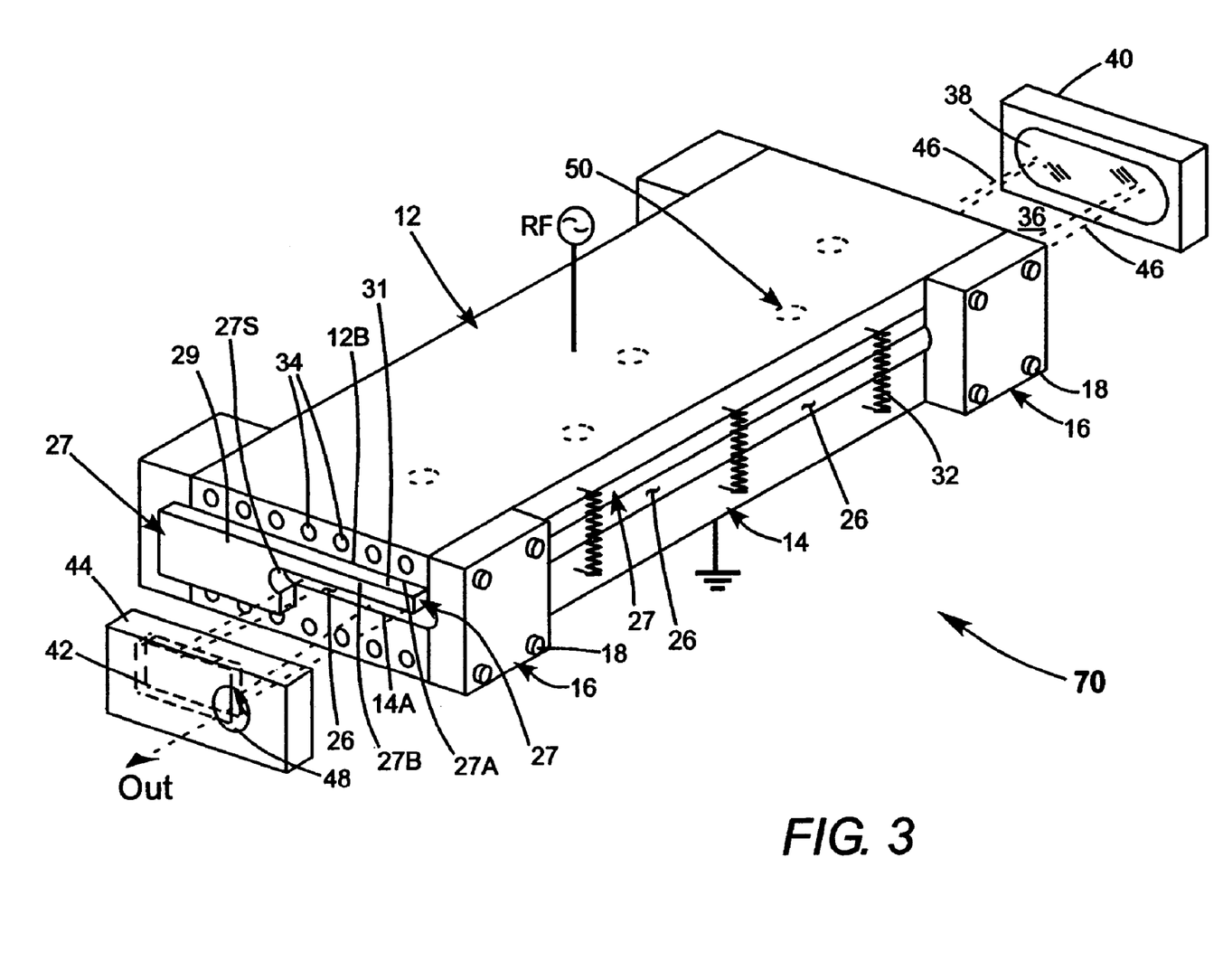
FIG. 3 schematically illustrates yet another preferred embodiment of a $CO_2$ slab laser in accordance with the present invention, similar to the laser of FIG. 1, but wherein the ceramic slab has a thick portion thereof completely filling the space between the electrodes.

FIG. 3 schematically illustrates yet another embodiment 70 of a slab $CO_2$ laser 60 in accordance with the present invention. Laser 60 includes first and second elongated slab electrodes 12 and 14, held spaced apart by ceramic spacers 16 as in laser 60. Here again, as the electrodes and spacers have the same function in both lasers, the electrodes and spacers are designated by the same numerals, even though electrodes 12 and 14 may be wider in laser 70 than in laser 60, and the spacers differ in shape. Located between electrodes 12 and 14 is a ceramic slab 27. Surface 27A of ceramic slab 27 is in contact with surface 12B of electrode 12. Slab 27 includes a thick portion 29 and a thin portion 31 extending along the entire length of the slab. The thickness of the thin portion is preferably greater than 0.5 mm. Thick portion 29 of the ceramic slab extends beyond the edges of the electrodes, and preferably also beyond the ends of the electrodes, for reasons discussed above with reference to laser 60 of FIG. 2.

Thick portion 29 of the ceramic slab is in contact with both electrodes, with upper surface 27A of the slab in contact with surface 12B of electrode 12. This maintains surface 27B of slab 27 on thin portion 31 thereof, spaced apart from surface 14A of electrode 14, thereby providing a discharge gap 26 having a height about equal to the difference in thickness between the thicknesses of portions 29 and 31 of ceramic slab 27. An RF discharge is created in gap 26 as described above with reference to laser 10 of FIG. 1. As in laser 60, the width of gap 26 is less than the width of the electrodes. An unstable resonator 36 is formed by a concave mirror 38 and a concave mirror 42 as described above with reference to laser 10 of FIG. 1.

On a side of the slab electrode and ceramic slab assembly corresponding to thin portion 31 of ceramic slab, discharge gap 26 is open along the length of the assembly, less that portion of the length occupied by ceramic spacers 16. This facilitates entry of lasing gas into gap 26 and minimizes the possibility of acoustic resonance as noted above. A curved surface 27S formed at the junction of the thin and thick portions of ceramic slab 27 in effect forms a single sidewall extending along the discharge gap.

The function of ceramic slab 27 is similar to that of ceramic slab 21 of laser 60. inasmuch as thick portion 29 of ceramic slab 27, combined with the additional electrode width provide for increasing the capacitive component of the electrode impedance and reducing the impedance difference between lit and unlit conditions. Having gap 26 open along most of the length of the electrode assembly provides for better gas access to the discharge gap than does ceramic slab arrangement 21 of laser 60, and also provides for superior high order optical mode discrimination compared with slab 21.

In embodiments of the inventive slab laser described above, the assembly of slab electrodes, ceramic spacers and the ceramic insert between the electrodes is structurally independent of any enclosure containing the assembly and a lasing-gas mixture. It is possible, however, to integrate the electrode-ceramic assembly into such an enclosure. A description of one example of such an integrated structure is set forth below with reference to FIG. 4 and FIG. 5.

Figure 4:
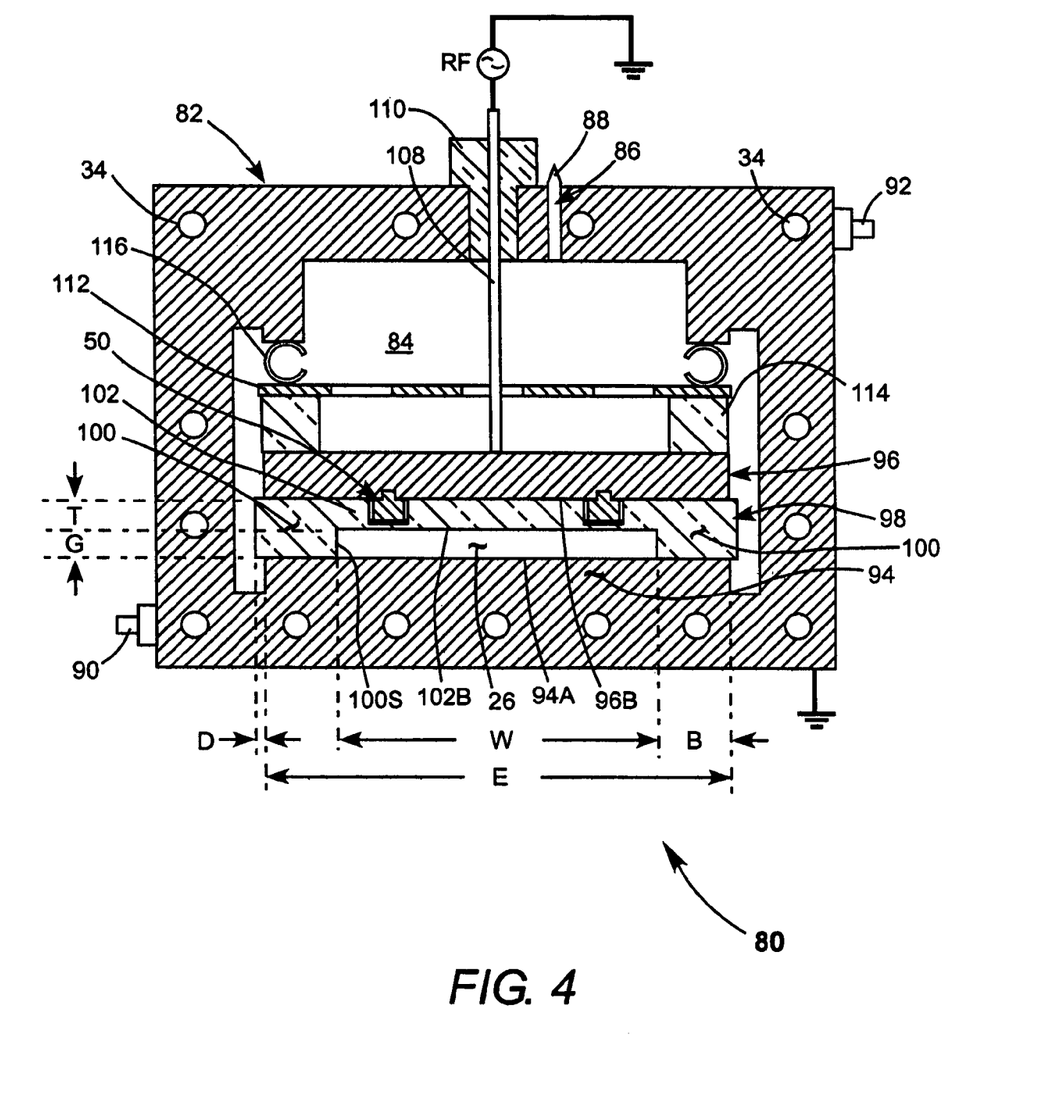
FIG. 4 is a cross-section view seen generally in the direction 4-4 of FIG. 5 schematically illustrating still another embodiment of a $CO_2$ slab laser in accordance with the present invention similar to the laser of FIG. 1 but wherein one of the slab electrodes is provided by a sealed enclosure surrounding the other electrode and the ceramic slab.
Figure 5:
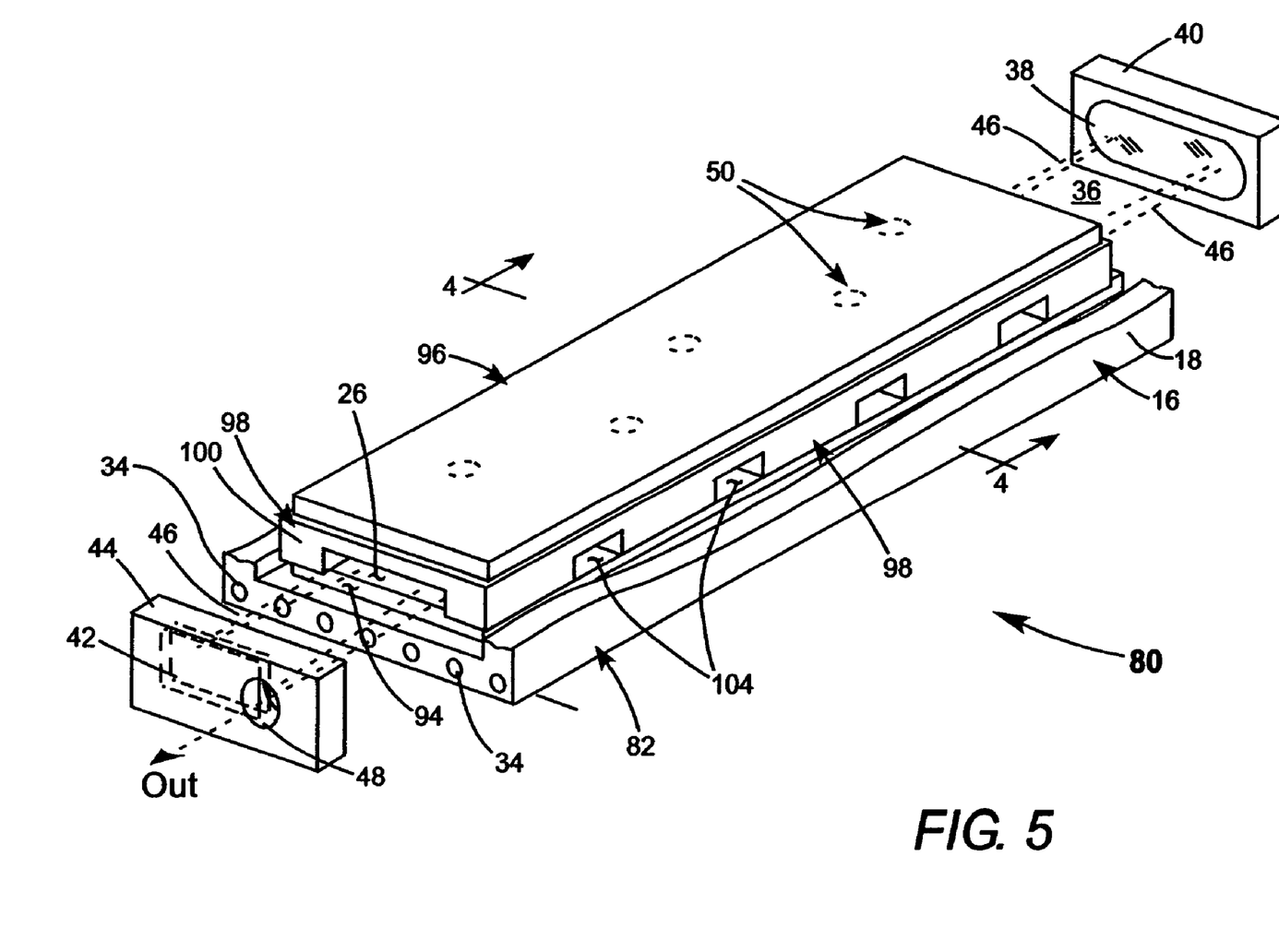
FIG. 5 is a three-dimensional view schematically illustrating details of the electrode and ceramic slab arrangement of FIG. 4

FIG. 4 is a cross-section view schematically illustrating an embodiment 80 of a slab $CO_2$ laser in accordance with the present invention integrated into a metal enclosure 82. FIG. 5 is three-dimensional view schematically illustrating laser 80 with enclosure 82 partially cut away. Enclosure 82 is preferably formed from extruded aluminum components and is electrically connected to ground potential. Interior 84 of enclosure 82 is filled with a lasing gas via a port 86, the tip 88 of which can be sealed off, to seal enclosure 82 once lasing-gas filling is complete. Cooling channels 34 are provided in the base, sidewalls, and top of enclosure 82. Cooling fluid is directed into the channels via an inlet port 90 and exits the channels via an outlet port 92.

A raised base-portion 94 of enclosure 82 forms a ground electrode for slab laser 80. Electrode 94 has a width E. A separate top or "hot" electrode 96 is spaced apart from ground electrode 94 by a ceramic slab 98 having raised edge portions 100. These edge portions of slab 98 have a width B and overhang electrode 94 by a distance D. Width B is determined, inter alia, by the amount of capacitance desired for given W, G, and T dimensions, gas pressure and excitation frequency. Overhang D is provided for the purpose of increasing surface resistance between the electrodes as noted above with reference to laser 60 of FIG. 2.

A thinner central portion 102 of ceramic slab 98 has a width W and a thickness T. A discharge gap 26 is formed between upper surface 94A of ground electrode 94 and lower surface 102B of central portion 102 of ceramic slab 98. A discharge is sustained in gap 26 by an RF potential applied across the gap. Igniters 50 are provided to facilitate igniting the discharge. RF power is applied to electrode 96 via a connector 108. Connector 108 enters enclosure 82 via an insulated feedthrough 110. An inductive path to ground is provided by a serpentine inductor 112 spaced apart from electrode 96 by ceramic insulating pads 114. Inductor 112 is connected to grounded enclosure 82 via low inductance, compressive springs 116. It should be noted here that cooling channels 34 are depicted in the laser housing and that while electrode 96 is described here, and in other embodiments of the inventive laser described below, as not include channels, such cooling channels could be included without departing from the spirit and scope of the present invention.

Referring in particular to FIG. 5, resonator arrangements for laser 80 are similar to those of other above-described embodiments of the inventive laser. An unstable resonator 36 is formed by a concave mirror 38 held in a mirror holder 40, and a concave mirror 42 (indicated in phantom) held in a mirror holder 44. The unstable resonator is arranged such that laser radiation circulates through gap 26 between ceramic slab 20 and electrode and exits past the edge of mirror 42. Preferably, vertical surfaces 100S of thick portions 100 of ceramic slab 98 are roughened to minimize any possible guiding action that might compromise the function of resonator mirrors 38 and 42 in determining laser mode behavior in the plane parallel to the plane of the electrodes. Apertures 104 are provided along the length of edge portions 100 of ceramic slab 98, extending laterally through the edge portions to facilitate flow of lasing gas into discharge gap 26 and minimizing acoustic resonances as noted above.

Figure 6:
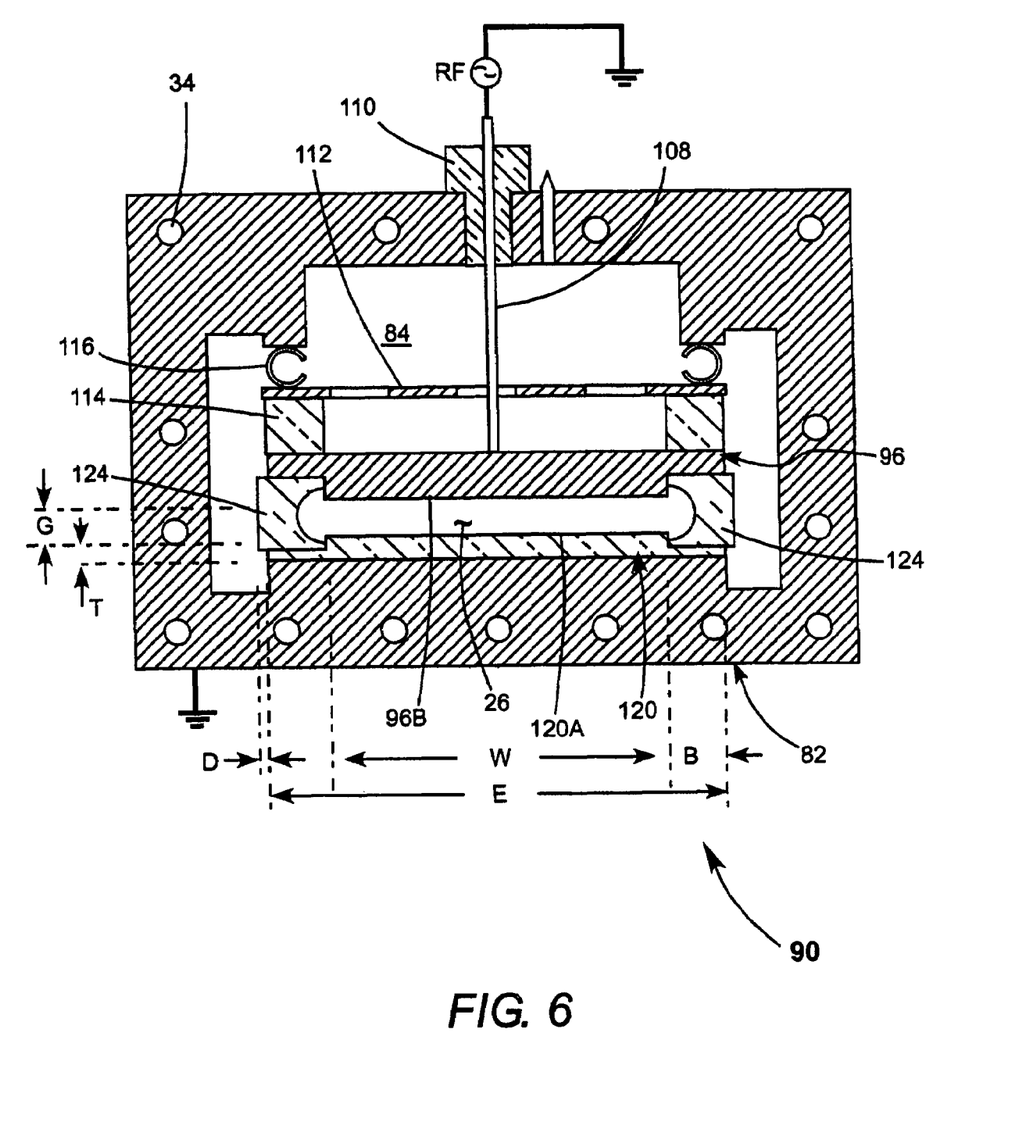
FIG. 6 is a cross-section view seen generally in the direction 6-6 of FIG. 7 schematically illustrating still another embodiment of a $CO_2$ slab laser in accordance with the present invention similar to the laser of FIG. 5 but including a ceramic slab arrangement similar to that of the laser of FIG. 1.
Figure 7:
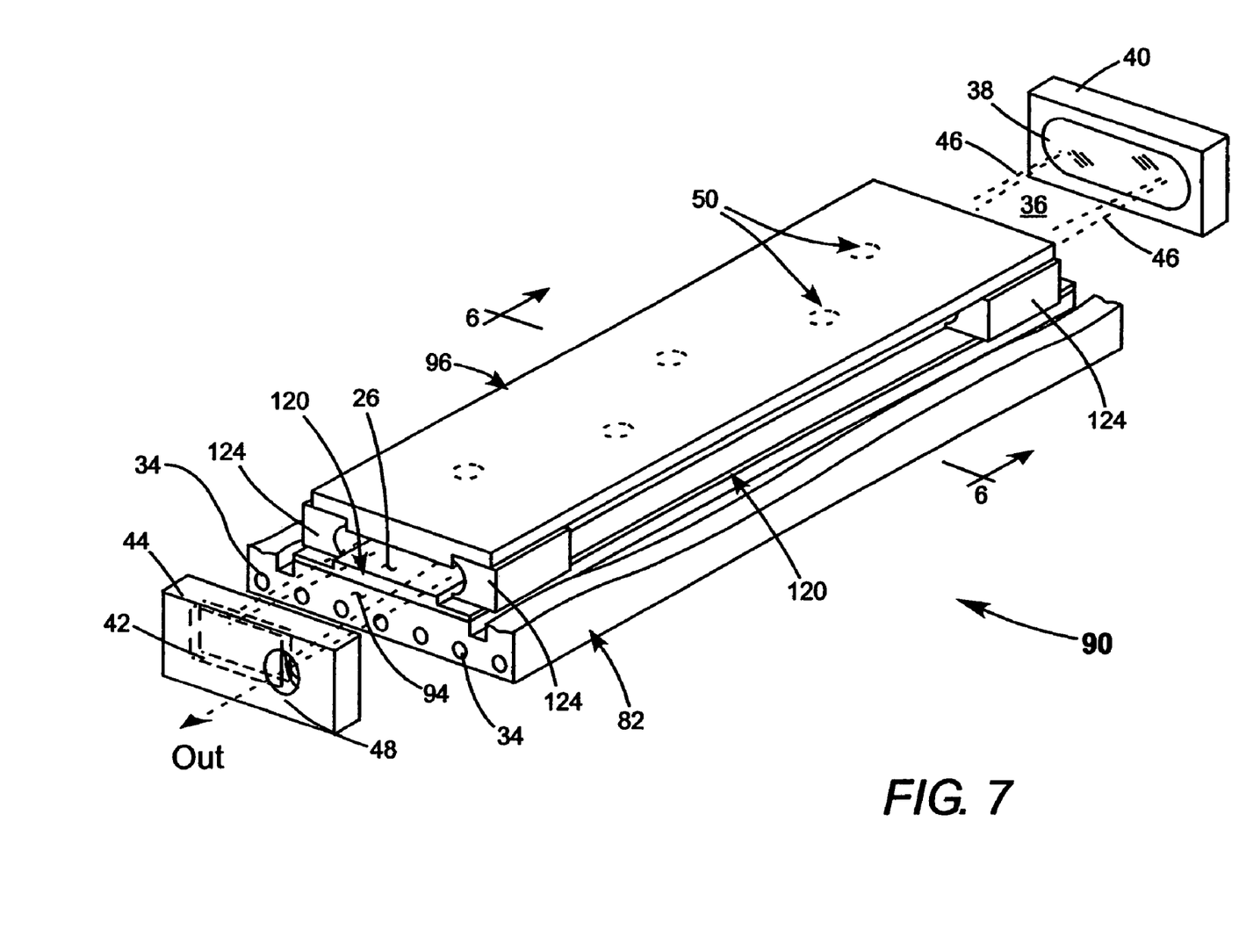
FIG. 7 is a three-dimensional view schematically illustrating details of the electrode and ceramic slab arrangement of FIG. 6

FIG. 6 is a cross-section view schematically illustrating another embodiment 90 of a slab $CO_2$ laser in accordance with the present invention integrated into a metal enclosure 82. FIG. 7 is three-dimensional view schematically illustrating laser 90 with enclosure 82 partially cut away. Here again, a raised base-portion 94 of enclosure 82 forms a ground electrode for slab laser 90. A ceramic slab 120 is supported on electrode 94 and extends along the length of the electrode. Hot electrode 96 is spaced apart from ground electrode 94 by ceramic spacers 124 located between the electrodes.

Spacers 124 are located at the ends of the electrodes only. A discharge gap 26 is formed between upper surface 120A of ceramic slab 120 and lower surface 96B of electrode 96. Discharge gap 26 here has a width W corresponding to the width of that portion of surface 96B of electrode 96 not covered ceramic spacers 124. A discharge is sustained in gap 26 by an RF potential applied across the gap. Igniters 50 are provided to facilitate igniting the discharge. RF power is applied to electrode 96 as discussed above with reference to laser 80 of FIG. 4.

Spacers 124 are located (see FIG. 7) only at the corners of electrode 96. This leaves the electrode and ceramic slab assembly open along most of the length of both sides thereof for facilitating lasing gas flow into discharge gap 26. Preferably, spacers 124 occupy less than one-eighth of the length of electrode 96. Laser 90 includes an unstable resonator arranged as discussed above with respect to laser 80 of FIG. 5.

In all embodiments of the inventive slab $CO_2$ laser described above there is a ceramic slab on only one side of the discharge gap 26. This should not be construed, however, as limiting the present invention to those or any similar embodiments. Additional capacity can be achieved by having a ceramic slab in contact with each of the electrodes, such that the discharge gap 26 is formed between the ceramic slabs. One such embodiment is described below with reference to FIG. 8.

Figure 8:
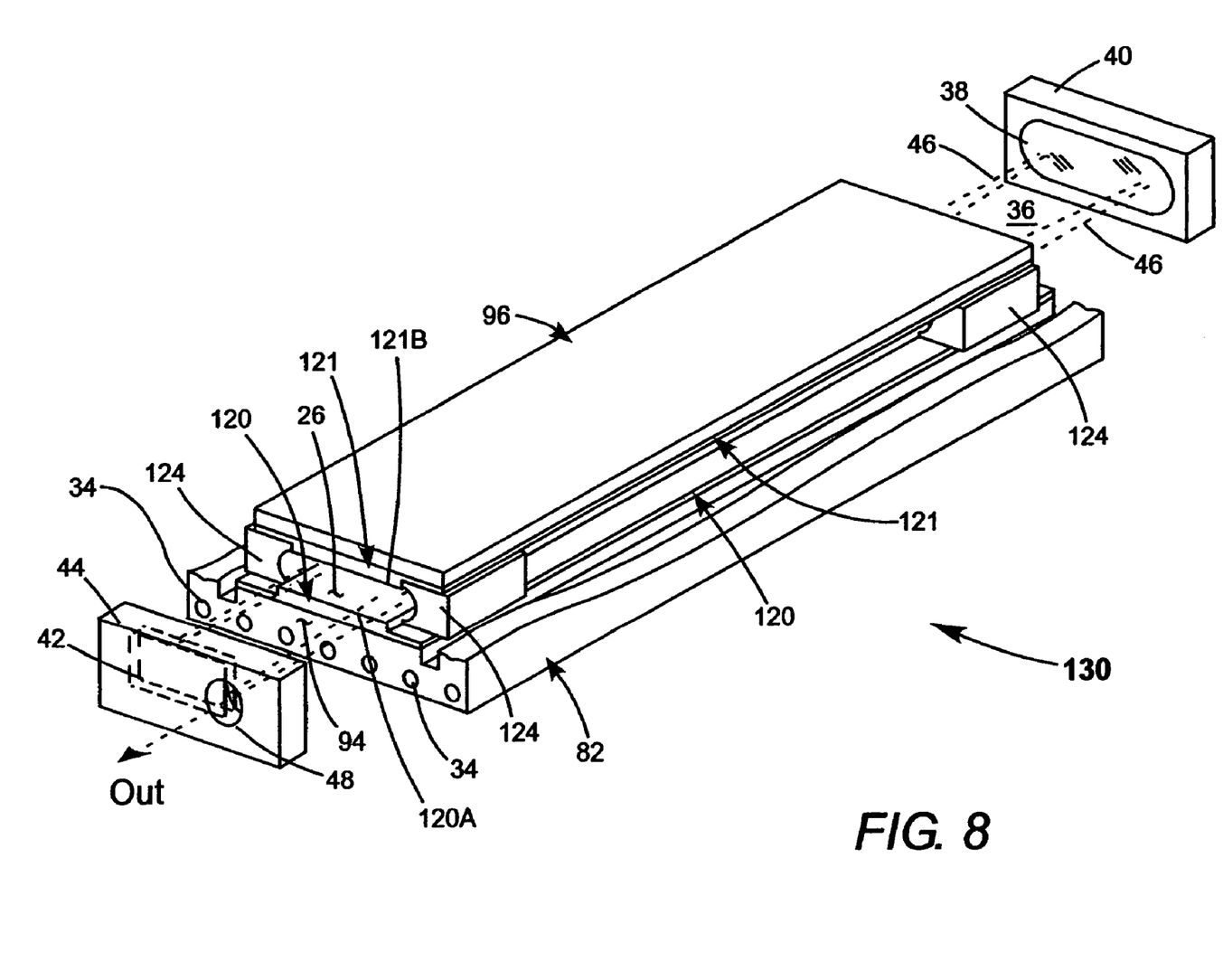
FIG. 8 is a three-dimensional view schematically illustrating a further embodiment of a $CO_2$ slab laser in accordance with the present invention, similar to the laser of FIG. 7, but including two ceramic slabs arranged such that a discharge gap is formed between the ceramic slabs.

FIG. 8 schematically illustrates an embodiment 130 of a slab $CO_2$ laser in accordance with the present invention. Laser 130 is similar to laser 90 of FIG. 7 with an exception that in addition to a ceramic slab 120 in contact with electrode 94, there is a similar ceramic slab 121 in contact with hot electrode 96. In laser 90, discharge gap 26 is formed between lower surface 121B of ceramic slab 121 and upper surface 120A of ceramic slab 120.

One disadvantage of including two dielectric slabs and forming the discharge gap between those slabs is that laser output will not be plane polarized as would be the case in embodiments of the inventive laser wherein the discharge gap is formed between a dielectric slab and a metal electrode. If a polarized output is required a separate polarizer (not shown in FIG. 8) should be included in resonator 36.

Figures 9, 9A:
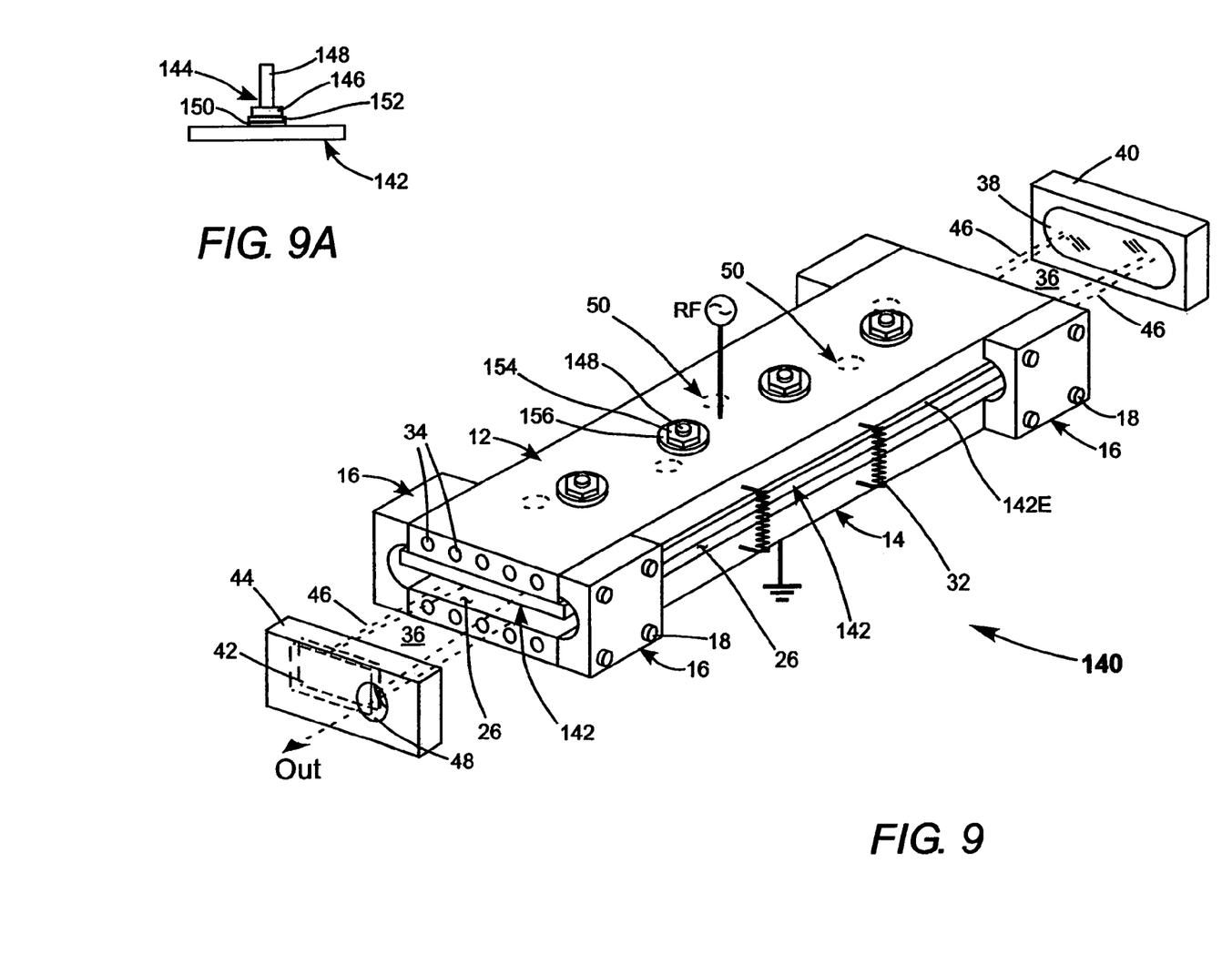
FIG. 9 is a three-dimensional view schematically illustrating another further embodiment of a $CO_2$ slab laser in accordance with the present invention, similar to the laser of FIG. 2, but wherein the ceramic slab is clamped to the first electrode via a bolt bonded to the slab and extending through the electrode.
FIG. 9A is an end elevation view schematically illustrating detail of bonding the bolt to the ceramic slab of FIG. 9.

Another further embodiment 140 of a slab laser in accordance with the present invention is schematically illustrated in FIG. 9. Laser 140 is similar to laser 60 of FIG. 2 with an exception that ceramic slab 21 of laser 60 is replaced with a slab 142 that is held in contact with hot electrode 12. Slab 142 is wider than electrode 12, such that an edge portion 142E of the slab extends laterally beyond the electrode for reasons discussed above. Detail of the holding arrangement is depicted in FIG. 9A. Here a bolt 144, having a head 146 and a post 148, has head 146 thereof bonded via a solder bond 152 to metal pad 150 that is deposited on slab 142. A plurality of such bonded bolts, here four, are disposed along the length of slab 142. The bolts extend through holes (not shown) in electrode 12. Nuts 154 and spring washers 156 are attached to the posts to hold the ceramic slab in contact with the electrode (see FIG. 9). The spring washers accommodate relative difference in expansion between the slab and the electrode in a direction perpendicular to the plane of the electrodes. The holes through the electrodes have a diameter sufficiently large to accommodate expansion difference between the slab and the electrodes in directions parallel to the plane of the electrodes. One advantage of this electrode arrangement is that the slab has a simple shape that does not require complicated machining operations during fabrication. This also allows the slab to be made with a minimum thickness somewhat less than that of the more complex slabs of other above-described embodiments of the inventive laser. This thickness however is preferably greater the 0.5 mm as is the case for the minimum slab thickness in all other above described embodiments of the present invention.

Lasers 60, 70, 80, 90, 130, and 140 are depicted without ceramic waveguide extensions between electrodes and mirrors discussed with reference to laser 10 of FIG. 1B. Such extensions may be, and preferably are, incorporated in a configuration similar to that described above with reference to extensions 20E and 19 of laser 10 of FIG. 1A. Those skilled in the art will recognize without further description or illustration how such extensions can be adapted to the particular embodiments.

Experiments with a dielectric coupled slab laser in accordance with the arrangement of laser 70 of FIG. 3 have indicated that a considerable improvement in performance is possible compared with that of a comparable slab laser without a dielectric insert. The experimental laser was able to operate at a pulsed RF peak power of 13 KW at 145 Torr gas pressure. This power output was limited by reaching a limit in the output of an RF power supply driving the laser rather than by the onset of arcing. A comparable CO2 slab laser without a dielectric insert was able to operate at only 8.7 KW peak pulse power at 140 Torr gas pressure before arcing occurred. The power output of the experimental laser represents a performance increase of at least 49% over a prior-art laser about the same dimensions.

In summary, the present invention is described above with reference to a preferred and other embodiments. The invention is limited, however, to the embodiments described and depicted. Rather, the embodiment is defined by the claims appended hereto.

What is claimed is:

1. A laser comprising:

an enclosure containing a lasing gas;

first and second elongated, generally rectangular electrodes located in said enclosure, said electrodes having planar surface portions arranged spaced apart and face to face;

a solid dielectric material located between said electrodes in the form of one or more slabs extending along the length of said electrodes, said solid dielectric material having a total thickness less than the spacing between said electrodes, thereby leaving an elongated gap, said gap being between one of a gap between a said electrode and a dielectric slab, and a gap between two dielectric slabs, said gap being filled with said lasing gas;

a pair of mirrors configured and arranged to define a laser resonant cavity extending through said elongated gap, said gap having a height and a width;

means for exciting said lasing gas in said gap, thereby causing laser radiation to circulate in said resonant cavity; and wherein the height of said gap is selected such that said gap forms a waveguide for said laser radiation in the height direction, and the width of said gap is selected such that said laser radiation is allowed to propagate in free space in the width direction of said gap in a manner controlled by said configuration and arrangement of said mirrors.

2. The laser of claim 1, wherein said laser gas exciting means includes an RF generator, the output of which is coupled to one of said electrodes.

3. The laser of claim 1, wherein said laser resonator is an unstable resonator in the width direction of said gap.

4. The laser of claim 1, wherein any surfaces of said dielectric slabs and said electrodes bounding said gap are planar and parallel to each other.

5. The laser of claim 1, wherein there are first and second dielectric slabs between said electrodes, one surface of said first dielectric slab being in contact with a surface of said first electrode and one surface of said second dielectric slab being in contact with a surface of said second electrode, whereby said gap is formed between said first and second dielectric slabs.

6. The laser of claim 1, wherein said one slab of dielectric material has a thickness greater than about 0.5 millimeters.

7. The laser of claim 1, wherein the height of said gap between about 1 and 2 millimeters.

8. The laser of claim 1, wherein the width of said gap is between about 20 and 80 millimeters.

9. The laser of claim 1, wherein said enclosure is a metal enclosure and said second electrode is an integral part of said enclosure.

10. The laser of claim 9, wherein said enclosure is connected to ground potential.

11. The laser of claim 1, wherein said one slab of dielectric material is retained in contact with said first electrodes by a plurality of bolts bonded to said slab and extending through said first electrode.

12. A laser comprising:

an enclosure containing a lasing gas;

first and second elongated generally rectangular electrodes located in said enclosure, said electrodes having planar surface portions arranged spaced apart and face to face;

a slab of a solid dielectric material located between said electrodes and extending along the length of said electrodes, said slab having a thickness less than the spacing between said electrodes and being arranged adjacent said first electrode, thereby leaving a gap between said slab and said second electrode, said gap being filled with said lasing gas;

a pair of mirrors configured and arranged to define a laser resonant cavity extending through said elongated gap, said gap having a height and a width;

means for exciting said lasing gas in said gap, thereby causing laser radiation to circulate in said resonant cavity; and wherein the height of said gap is selected such that said gap forms a waveguide for said laser radiation in the height direction, and the width of said gap is selected such that said laser radiation is allowed to propagate in free space in the width direction of said gap in a manner controlled by said configuration and arrangement of said mirrors.

13. The laser of claim 12, wherein said laser gas exciting means includes an RF generator, the output of which is coupled to one of said electrodes.

14. The laser of claim 12, wherein said laser resonator is an unstable resonator in the width direction of said gap.

15. The laser of claim 12, wherein the surfaces of said dielectric slab and said electrode bounding said gap are planar and parallel to each other.

16. The laser of claim 12, wherein said slab of dielectric material has a thickness greater than about 0.5 millimeters.

17. The laser of claim 12, wherein the height of said gap between about 1 and 2 millimeters.

18. The laser of claim 12, wherein the width of said gap is between about 20 and 80 millimeters.

19. The laser of claim 12, wherein said enclosure is a metal enclosure and said second electrode is an integral part of said enclosure.

20. A laser comprising:

an enclosure containing a lasing gas;

first and second elongated electrodes located in said enclosure, said electrodes having planar surface portions arranged spaced apart and face to face;

a solid dielectric material located between said electrodes in the form of a single slab extending along the length of said electrodes, with one surface of said dielectric slab being in contact with a surface of said first electrode, said solid dielectric slab having a total thickness less than the spacing between said electrodes, thereby leaving an elongated gap, said gap being between one of said electrodes and said dielectric slab, said gap being filled with said lasing gas;

a pair of mirrors configured and arranged to define a laser resonant cavity extending through said elongated gap, said gap having a height and a width;

means for exciting said lasing gas in said gap, thereby causing laser radiation to circulate in said resonant cavity; and wherein the height of said gap is selected such that said gap forms a waveguide for said laser radiation in the height direction, and the width of said gap is selected such that said laser radiation is allowed to propagate in free space in the width direction of said gap in a manner controlled by said configuration and arrangement of said mirrors.

21. A laser comprising:

an enclosure containing a lasing gas;

first and second elongated generally rectangular electrodes located in said enclosure, said electrodes having planar surface portions arranged spaced apart and face to face;

a solid dielectric material located between said electrodes in the form of one or more slabs extending along the length of said electrodes, said solid dielectric material having a total thickness less than the spacing between said electrodes, thereby leaving an elongated gap, said gap being between one of a gap between a said electrode and a dielectric slab, and a gap between two dielectric slabs, said gap being filled with said lasing gas, wherein said one slab of dielectric material has a width greater than the width of said elongated electrodes and is arranged to extend laterally beyond opposite longitudinal edges of said electrodes;

a pair of mirrors configured and arranged to define a laser resonant cavity extending through said elongated gap, said gap having a height and a width;

means for exciting said lasing gas in said gap, thereby causing laser radiation to circulate in said resonant cavity; and wherein the height of said gap is selected such that said gap forms a waveguide for said laser radiation in the height direction, and the width of said gap is selected such that said laser radiation is allowed to propagate in free space in the width direction of said gap in a manner controlled by said configuration and arrangement of said mirrors.

22. The laser of claim 21, wherein said slab extends at least 2.0 millimeters beyond said electrode edges.

23. A laser comprising:

an enclosure containing a lasing gas;

first and second elongated electrodes located in said enclosure, said electrodes having planar surface portions arranged spaced apart and face to face;

a slab of a solid dielectric material located between said electrodes and extending along the length of said electrodes, said slab having a thickness less than the spacing between said electrodes and being arranged adjacent said first electrode, thereby leaving a gap between said slab and said second electrode, said gap being filled with said lasing gas, said slab of dielectric material having two raised edge portions extending therealong, one thereof on each side of said gap, said raised edge portions of slab having a thickness equal to the spacing between said electrodes;

a pair of mirrors configured and arranged to define a laser resonant cavity extending through said elongated gap, said gap having a height and a width;

means for exciting said lasing gas in said gap, thereby causing laser radiation to circulate in said resonant cavity; and wherein the height of said gap is selected such that said gap forms a waveguide for said laser radiation in the height direction, and the width of said gap is selected such that said laser radiation is allowed to propagate in free space in the width direction of said gap in a manner controlled by said configuration and arrangement of said mirrors.

24. The laser of claim 23, wherein said one slab of dielectric material has a width greater than the width of said elongated electrodes and is arranged such that said raised edge portions thereof extend laterally beyond opposite longitudinal edges of said electrodes.

25. The laser of claim 24, wherein said raised edge portions of said slab extend at least 2.0 millimeters beyond said electrode edges.

26. The laser of claim 23, wherein at least one of said raised edge portions of said slab has a plurality of spaced apart apertures extending laterally therethrough for facilitating flow of said lasing gas into said gap.

* * * * *